Sept. 20, 1971　　　　　　　　R. E. LALLY　　　　　　　3,606,405
FISHLINE TYING DEVICE
Filed Oct. 29, 1969　　　　　　　　　　　　　　　　2 Sheets-Sheet 1
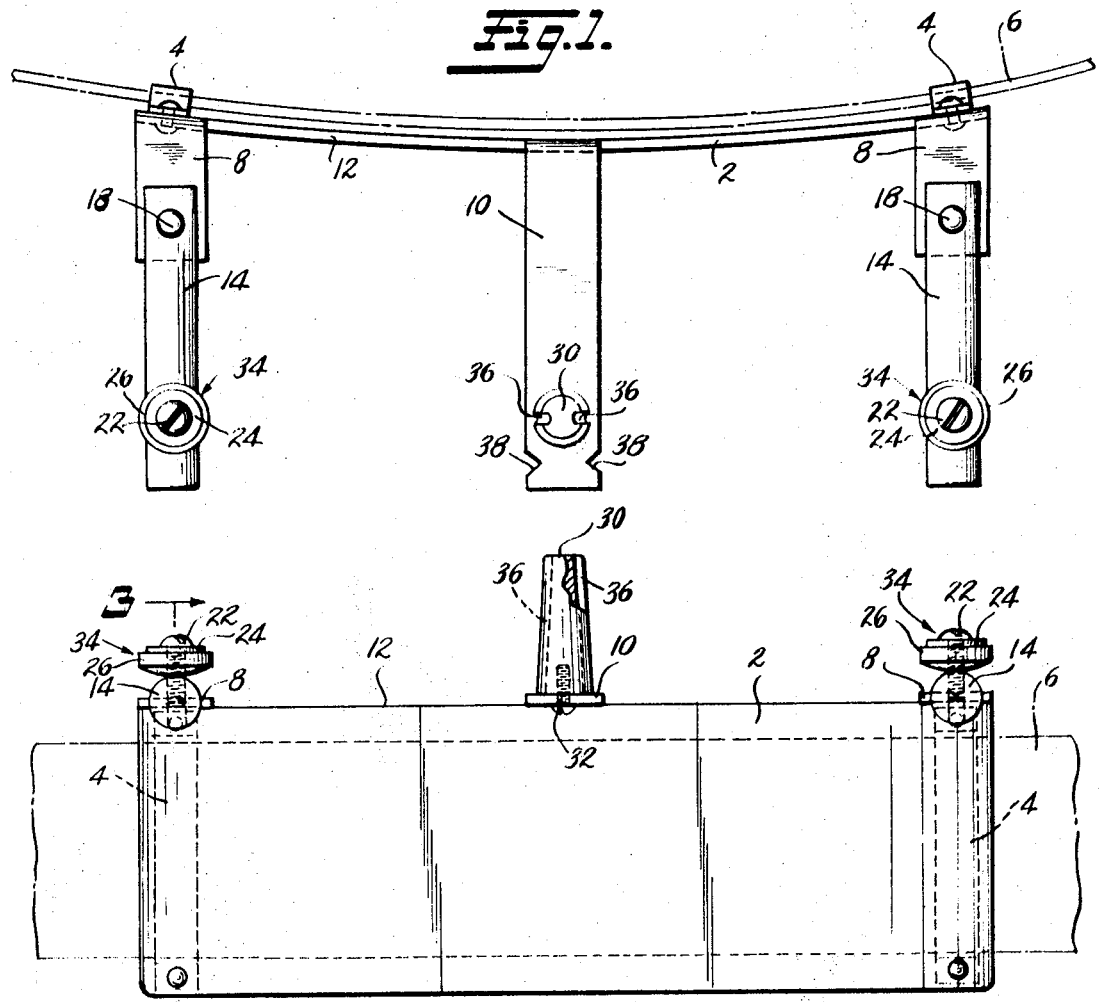
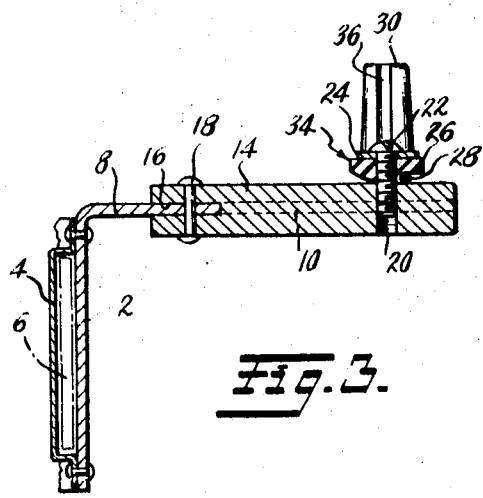
INVENTOR.
ROBERT E. LALLY
BY
Bacon & Thomas
ATTORNEYS

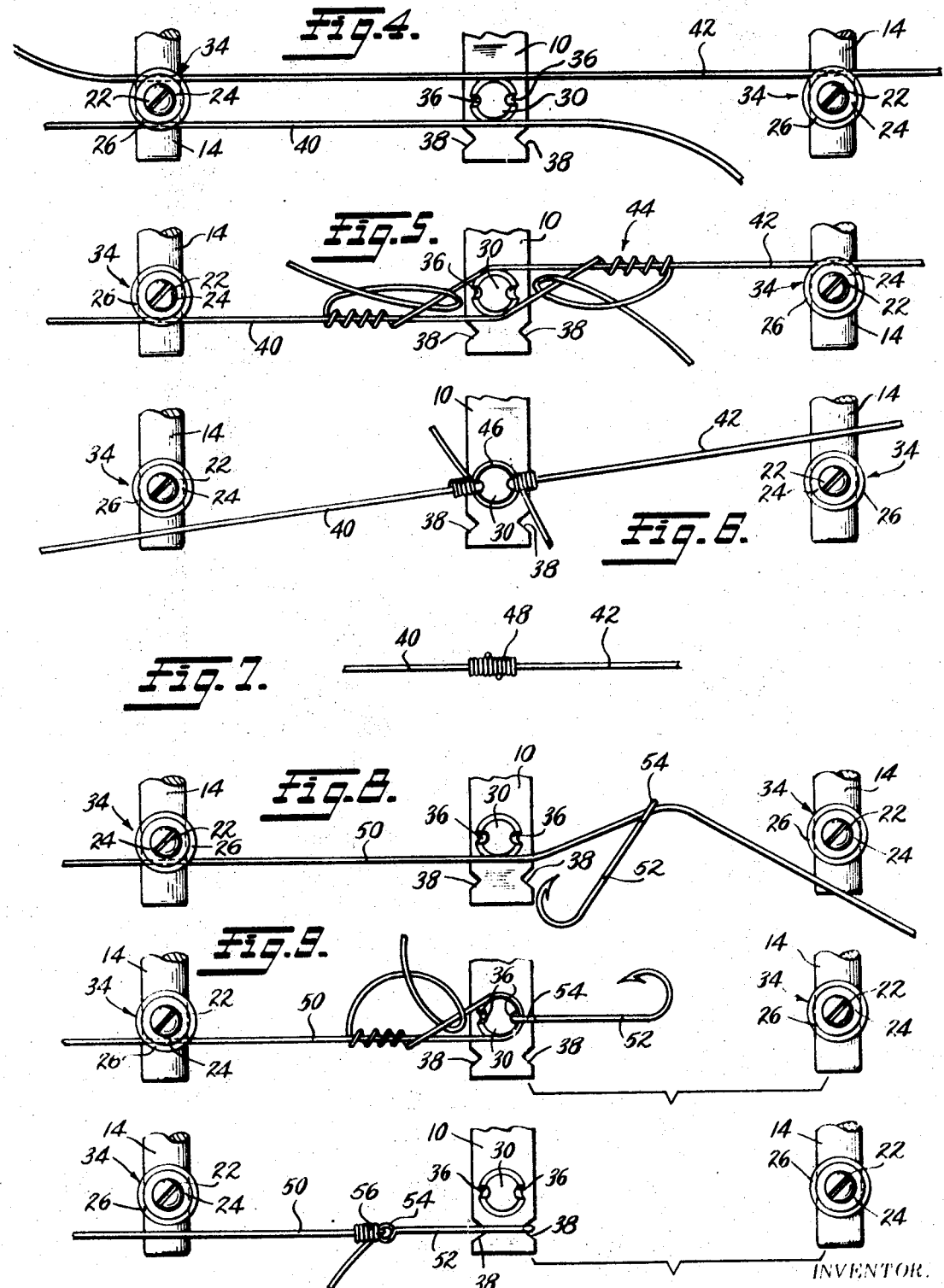

United States Patent Office 3,606,405
Patented Sept. 20, 1971

3,606,405
FISHLINE TYING DEVICE
Robert E. Lally, 10153 Camwood Drive,
El Paso, Tex. 79925
Filed Oct. 29, 1969, Ser. No. 872,115
Int. Cl. D03j 3/00
U.S. Cl. 289—17          5 Claims

ABSTRACT OF THE DISCLOSURE

A curved sheet metal base having belt loops and outwardly bent ears respectively supporting spaced resilient line grippers and a central post. The post tapers upwardly and the ear on which it is mounted is notched on opposite edges. The post has longitudinal grooves on opposite sides, facing said line grippers.

BACKGROUND OF THE INVENTION

This invention relates to devices for holding fish lines, leaders, hooks and other lures in a manner to facilitate tying lines and/or leaders, and/or attaching hooks or other lures thereto.

Devices have been proposed heretofore for assisting in tying together lengths of fishline or leader and attaching them to hooks or the like. For example, the patent to Holland 2,498,920 discloses such a device but discloses a relatively complicated structure and one that must be clamped to a table or similar support for use. There has long been a need for a suitable device of this type capable of being carried into the field and used by the angler while fishing, without the necessity of returning to a camp or workshop.

SUMMARY OF THE INVENTION

Essentially, applicant's invention comprises an attachment that can be worn on a fisherman's belt to be instantly available and it comprises simple and inexpensive structural features providing spaced clamps or grippers for holding the lines to be joined while leaving their adjacent ends free, and an upwardly tapered center post therebetween. The grippers and center post are positioned on the attachment to be spaced outwardly from the fisherman's waist so as to be readily accessible for use and yet in a position so as not to interfere with his normal fishing activities.

The grippers are formed by a rigid member and an elastomeric washer bearing thereon and under which portions of adjacent lines or leader sections can be positioned to be frictionally held thereby and the free ends of the lines or leaders may then be tied around the center post and drawn tight therearound, after which they are moved upwardly to slide free of the post, which is facilitated by the tapering sides thereof, thus freeing the completed knot.

BRIEF DESCRIPTION OF THE DRAWINGS

FIG. 1 is a top plan view of a preferred embodiment of the invention;

FIG. 2 is a front elevational view of the device shown in FIG. 1;

FIG. 3 is a vertical sectional view taken along the line 3—3 of FIG. 2; and

FIGS. 4 through 10 are fragmentary views illustrating the use of the device for different types of operation.

DESCRIPTION OF A PREFERRED EMBODIMENT

Referring first to FIGS. 1–3, numeral 2 indicates a base plate, preferably but not necessarily of metal and arranged to normally extend in a generally vertical direction but being curved from end to end to generally conform to the curvature of the waist of the user. Belt loops 4 are secured to one face of the plate 2 at opposite ends thereof whereby the user's belt 6 may be slipped through the loops 4 in an obvious manner to support the device at the user's waist. End tabs 8 and central tab 10 are integral portions of the plate 2 formed to extend from the upper edge 12 thereof and bent to extend outwardly in a direction opposite from the belt loops 4. A pair of rigid rods 14 are provided with slots 16 at their inner ends embracing the outer end portions of the end tabs 8 and the rods are secured to those tabs, such as by rivets 18 or the like. Thus, the rods 14 constitute rigid extensions of the ears or tabs 8. Adjacent its outer end each rod 14 is provided with a threaded opening 20 threadedly receiving a screw 22. Each screw 22 passes through a rigid washer 24 and through a washer 26 of rubber or similar elastomeric material, the lower face of which bears against the upper surface of rod 14. As shown, the lower face of each washer 26 is convex so as to define wedge shaped, peripheral notches between it and the upper surface of the rods 14. FIG. 3 illustrates how a section of fishline or leader 28 can be wedged between the washer 26 and rod 14 to be frictionally held thereby for a purpose to be later described. The screw 22 may be threaded farther into or back out of the opening 20 to thus regulate or change the pressure exerted by the washer 26 on a fishline or leader section 28. In this manner, the grippers may be adjusted to properly hold leader or line of any diameter or material.

The central tab 10 supports an upstanding post 30, which is secured thereto adjacent the outer end of tab 10 by a screw 32 or the like. As shown, the post 30 extends downwardly to a position below a line joining the tops of the rods 14, which line is the normal direction or extent of a fishline or leader extending between the grippers, designated generally by numeral 34. The post 30 also extends a substantial distance upwardly above the line referred to and is preferably of cone shape from end to end, that is, the side walls of the post taper upwardly. Opposite side edges of the post 30 are provided with longitudinal grooves 36, there being a groove 36 facing each of the grippers 34, as shown. The tab or ear 10 on which post 30 is mounted extends outwardly beyond the bottom of the post 30 and its opposite edes are provided with generally V-shaped notches 38, as clearly shown in FIG. 1. It is to be noted that the post 30 and the notches 38 are substantially midway between the grippers 34 and are substantially on a line joining the centers of those grippers.

Refer now to FIGS. 4 through 6 wherein there is illustrated a sequence of steps in using the described device for joining two sections of line and/or leader together. First and second sections of fishline 40 and 42 are positioned so that they are respectively gripped by the grippers 34 in the manner generally indicated in FIG. 4, with their free ends extending inwardly toward and past center post 30 and the free end of 42 in the left hand gripper 34. The end portion of line section 40 is then wrapped around that portion of line 42 between post 30 and the right hand gripper 34 for four or five turns, as indicated at 44 in FIG. 5. The end of the line 40 is then looped back around itself adjacent post 30 and passed through the loop thus formed, all as clearly shown in FIG. 5. The free end of line 42 is then removed from the left hand gripper and manipulated in exactly the same manner as described to form the loose knot illustrated in FIG. 5. After the knot is thus loosely formed, the line sections 40 and 42 are pulled free of the grippers 34 to about the relative positions shown in FIG. 6 and tension is applied to the two line sections to draw the loose knot tightly around the center post 30, as shown. When this is accomplished the direction of pull on the line sections 40 and 42 is moved upwardly so as to slide the loop 46 of the knot upwardly along the tapered surface of the post 30. The taper of the post facilitates this upward movement and as it occurs, the loop 26 is drawn smaller and smaller to remain snug about the post. When the loop 46 is pulled free of the upper end of post 30, further tension on the line sections 40 and 42 will draw the knot up completely tight to the form of finished barrel knot shown at 48 in FIG. 7 after which projecting free ends of the line are cut off.

FIGS. 8 through 10 illustrate a further type of manipulation facilitated by the described device. In this series of steps, the line section 50 is first positioned to be frictionally held by one of the grippers 34 and is extended therefrom past the center post 30. The end portion of the line 50 is then passed through the eyelet or loop 54 of a fishhook or other lure. The end of the line 50 is then wrapped around the post 30 and the fishhook 52 is manipulated to position its eyelet 54 in that groove 36 of post 34 opposite the gripper 30 (FIG. 9) then holding the line 50. The free end of the line 50 is then formed into a loose barrel knot, as shown in FIG. 9. The knot illustrated herein is essentially the same barrel knot as described with reference to FIGS. 4–6. After the knot is thus loosely formed, it may be initially and partially tightened by removing the line 50 from the gripper 34 and applying tension thereto. However, to complete the knot with the line and hook completely free of post 30 would involve some danger to the fisherman since he would have to manually grip and apply tension to the hook 52. To avoid such danger, the hook 52 is positioned in the notch 38 opposite a gripper 34 and tension is then applied to the line 50 to draw the barrel knot tightly into finished form, all as shown in FIG. 10.

The hook may be then released from the notch 38 and after trimming excess line 50 from the knot 56, the hook and line are ready for use. The fisherman can then proceed with his fishing and it is not necessary to store or remove the tying device, it may be left secured to his belt and ready for further use at any time.

While a single specific embodiment of the invention is shown and described herein, the same is merely exemplary of the principles involved and other forms and materials may be resorted to.

I claim:

1. A fishline tying device comprising: a base member; a pair of spaced line grippers fixed relative to said base member; and an upstanding post fixed relative to said base member between and spaced from said grippers, said post being conically upwardly tapered from a position below the level of a line extending between said grippers to the upper end of said post, above said grippers.

2. A fishline tying device as defined in claim 1 wherein said post is provided with at least one longitudinal groove in its outer surface on a side thereof facing one of said grippers, said groove being of sufficient width and depth to receive a portion of a fishhook eye.

3. A fishline tying device as defined in claim 2 including a laterally extending ledge member adjacent the bottom of said post and having at least one notch in an edge thereof facing away from one of said grippers.

4. A fishline tying device as defined in claim 1 wherein each of said grippers comprises a member having an upper surface; an elastomeric washer having a convex lower surface resting on said upper surface; and securing means for varying the pressure of said washer against said upper surface.

5. A fishline tying device as defined in claim 1 wherein said base member comprises a generally vertical sheet material member horizontally curved to conform to the waist of a user having belt engaging loops thereon; and three integral ears extending laterally from the upper edge of said sheet metal member to one side thereof, said grippers and said post being respectively mounted on said ears.

References Cited

UNITED STATES PATENTS

| 1,486,070 | 3/1924 | Boedker | 289—17 |
| 2,469,037 | 5/1949 | Harvey | 289—17 |
| 2,498,920 | 2/1950 | Holland | 289—17 |
| 2,502,751 | 4/1950 | Roberts | 289—17 |

LOUIS K. RIMRODT, Primary Examiner